(12) United States Patent
Wang et al.

(10) Patent No.: US 12,031,829 B2
(45) Date of Patent: Jul. 9, 2024

(54) LOCALIZATION BASED ON SURROUNDING VEHICLES

(71) Applicant: Motional AD LLC, Boston, MA (US)

(72) Inventors: Yimu Wang, Pittsburgh, PA (US); Ning Xu, Pittsburgh, PA (US); Ajay Charan, Oakmont, PA (US); Yih-Jye Hsu, Pittsburgh, PA (US)

(73) Assignee: Motional AD LLC, Boston, MA (US)

( * ) Notice: Subject to any disclaimer, the term of this patent is extended or adjusted under 35 U.S.C. 154(b) by 470 days.

(21) Appl. No.: 17/111,488

(22) Filed: Dec. 3, 2020

(65) Prior Publication Data

US 2022/0178700 A1 Jun. 9, 2022

(51) Int. Cl.
*G01C 21/30* (2006.01)
*B60W 40/06* (2012.01)
(Continued)

(52) U.S. Cl.
CPC ............. *G01C 21/30* (2013.01); *B60W 40/06* (2013.01); *B60W 60/001* (2020.02);
(Continued)

(58) Field of Classification Search
CPC ............. B60W 40/06; B60W 60/001; B60W 2420/52; B60W 40/02; B60W 2050/0005; B60W 2050/0026; B60W 2420/00; B60Y 2400/30; G01C 21/30; G01C 21/36; G01C 21/3602; G01S 7/4004; G01S 7/497; G01S 13/89; G01S 17/89; G01S 7/4039; G01S 2007/4975; G05D 1/0088; G05D 2201/0213; G06N 3/04; G06N 3/08; G08G 1/20
(Continued)

(56) References Cited

U.S. PATENT DOCUMENTS 10,282,997 B2 * 5/2019 Gignac ................ G08G 1/167
11,507,107 B2 * 11/2022 Sakaguchi ........... G05D 1/0061
(Continued)

FOREIGN PATENT DOCUMENTS

EP 2551638 1/2013
EP 3447449 2/2019
(Continued)

OTHER PUBLICATIONS

[No Author Listed], "Surface Vehicle Recommended Practice: Taxonomy and Definitions for Terms Related to Driving Automation Systems for On-Road Motor Vehicles," SAE International, Standard J3016, Sep. 30, 2016, 30 pages.

*Primary Examiner* — Mohamed Abdo Algehaim

(74) *Attorney, Agent, or Firm* — Fish & Richardson P.C.

(57) ABSTRACT

Among other things, techniques are described for identifying sensor data from a sensor of a first vehicle that includes information related to a pose of at least two other vehicles on a road. The technique further includes determining a geometry of a portion of the road based at least in part on the information about the pose of the at least two other vehicles. The technique further includes comparing the geometry of the portion of the road with map data to identify a match between the portion of the road and a portion of the map data. The technique further includes determining a pose of the first vehicle relative to the map data based at least in part on the match.

19 Claims, 10 Drawing Sheets

(51) Int. Cl.
*B60W 60/00* (2020.01)
*G01S 7/40* (2006.01)
*G01S 7/497* (2006.01)
*G01S 13/89* (2006.01)
*G01S 17/89* (2020.01)
*G05D 1/00* (2024.01)
*G08G 1/00* (2006.01)

(52) U.S. Cl.
CPC ............ *G01S 7/4004* (2013.01); *G01S 7/497* (2013.01); *G01S 13/89* (2013.01); *G01S 17/89* (2013.01); *G08G 1/20* (2013.01); *B60W 2420/408* (2024.01); *G01S 7/4039* (2021.05); *G01S 2007/4975* (2013.01); *G05D 1/0088* (2013.01)

(58) Field of Classification Search
USPC .......................................................... 701/26
See application file for complete search history.

(56) References Cited

U.S. PATENT DOCUMENTS

| | | | | |
|---|---|---|---|---|
| 11,513,519 | B1* | 11/2022 | Akella | G08G 1/00 |
| 11,586,843 | B1* | 2/2023 | Pertsel | G06V 10/82 |
| 2008/0243378 | A1* | 10/2008 | Zavoli | G01C 21/28 |
| | | | | 701/533 |
| 2013/0030697 | A1* | 1/2013 | Bartels | G01C 21/30 |
| | | | | 701/446 |
| 2013/0131980 | A1* | 5/2013 | Ginsberg | G01C 21/32 |
| | | | | 701/446 |
| 2015/0233720 | A1* | 8/2015 | Harada | G06V 20/56 |
| | | | | 701/409 |
| 2016/0368505 | A1* | 12/2016 | Sorstedt | B60W 40/072 |
| 2017/0267248 | A1* | 9/2017 | Harda | B60W 30/143 |
| 2017/0314926 | A1* | 11/2017 | Royster | G01C 5/005 |
| 2018/0061226 | A1* | 3/2018 | Thelen | G08G 1/0112 |
| 2018/0067495 | A1* | 3/2018 | Oder | G05D 1/0255 |
| 2018/0099663 | A1* | 4/2018 | Diedrich | B60W 40/072 |
| 2018/0229737 | A1* | 8/2018 | Towal | G05D 1/0055 |
| 2018/0267172 | A1* | 9/2018 | Oh | G05D 1/0278 |
| 2018/0273031 | A1* | 9/2018 | Fujita | G05D 1/021 |
| 2018/0329418 | A1* | 11/2018 | Baalke | B60W 30/0956 |
| 2019/0064830 | A1* | 2/2019 | Funayama | G01C 21/3461 |
| 2019/0126921 | A1* | 5/2019 | Gwin | G08G 1/096827 |
| 2019/0137287 | A1* | 5/2019 | Pazhayampallil | G06F 16/29 |
| 2019/0145784 | A1* | 5/2019 | Ma | G06V 20/56 |
| | | | | 701/448 |
| 2019/0197325 | A1* | 6/2019 | Reiley | G08B 13/19602 |
| 2019/0234745 | A1* | 8/2019 | Lee | G05D 1/0274 |
| 2019/0266748 | A1* | 8/2019 | Ahmad | G06T 7/74 |
| 2019/0278292 | A1* | 9/2019 | Levinson | G06T 17/05 |
| 2019/0278293 | A1* | 9/2019 | Levinson | G06T 17/20 |
| 2019/0346847 | A1* | 11/2019 | Kamata | G05D 1/0257 |
| 2019/0347821 | A1* | 11/2019 | Stein | G06V 10/772 |
| 2019/0376797 | A1* | 12/2019 | Walls | G01C 21/3602 |
| 2020/0088527 | A1* | 3/2020 | Koda | G01C 21/30 |
| 2020/0090366 | A1* | 3/2020 | Korjus | G01C 21/3602 |
| 2020/0271453 | A1* | 8/2020 | Wang | G01C 21/30 |
| 2020/0380859 | A1* | 12/2020 | Lofter | G08G 1/096791 |
| 2020/0386572 | A1* | 12/2020 | Kubertschak | G01C 21/3602 |
| 2021/0089791 | A1* | 3/2021 | Sithiravel | G01S 7/4802 |
| 2021/0140789 | A1* | 5/2021 | Pauls | G01C 21/3848 |
| 2021/0158564 | A1* | 5/2021 | Chakravarty | G06K 19/07762 |
| 2021/0201145 | A1* | 7/2021 | Pham | G06V 10/82 |
| 2021/0406559 | A1* | 12/2021 | Efland | G01C 21/3841 |
| 2022/0266825 | A1* | 8/2022 | Dahlbäck | B60W 60/001 |
| 2023/0103248 | A1* | 3/2023 | Abrash | B60W 60/0027 |
| | | | | 701/26 |
| 2023/0286536 | A1* | 9/2023 | Belman | G01C 21/3415 |

FOREIGN PATENT DOCUMENTS

| | | |
|---|---|---|
| JP | 2015-001773 | 1/2015 |
| KR | 10-1526816 | 6/2015 |
| KR | 2018-0106417 | 10/2018 |
| KR | 10-2018-0119240 | 11/2018 |
| KR | 10-2018-0124713 | 11/2018 |
| KR | 10-2019-0097453 | 8/2019 |
| KR | 10-2070171 | 3/2020 |

* cited by examiner

Identifying sensor data from a sensor of a first vehicle, wherein the sensor data includes information related to a pose of at least two other vehicles on a road relative to the first vehicle
1005

Determining a geometry of a portion of the road based at least in part on the information about the pose of the at least two other vehicles
1010

Comparing the geometry of the portion of the road with map data to identify a match between the portion of the road and a portion of the map data
1015

Determining a pose of the first vehicle relative to the map data based at least in part on the match
1020

FIG. 10

LOCALIZATION BASED ON SURROUNDING VEHICLES

FIELD OF THE INVENTION

This disclosure relates to localization based on surrounding vehicles.

BACKGROUND

An autonomous vehicle (AV) will use at least one sensor to identify where the AV is in a process referred to herein as localization. However, in dense urban areas the at least one sensor may be blocked. When the sensor(s) is blocked, the AV will be unable to extract enough information about the surroundings to perform localization.

BRIEF DESCRIPTION OF THE DRAWINGS

FIG. 10 shows an alternative example of a localization technique, in accordance with various embodiments.

DETAILED DESCRIPTION

Figure 1:
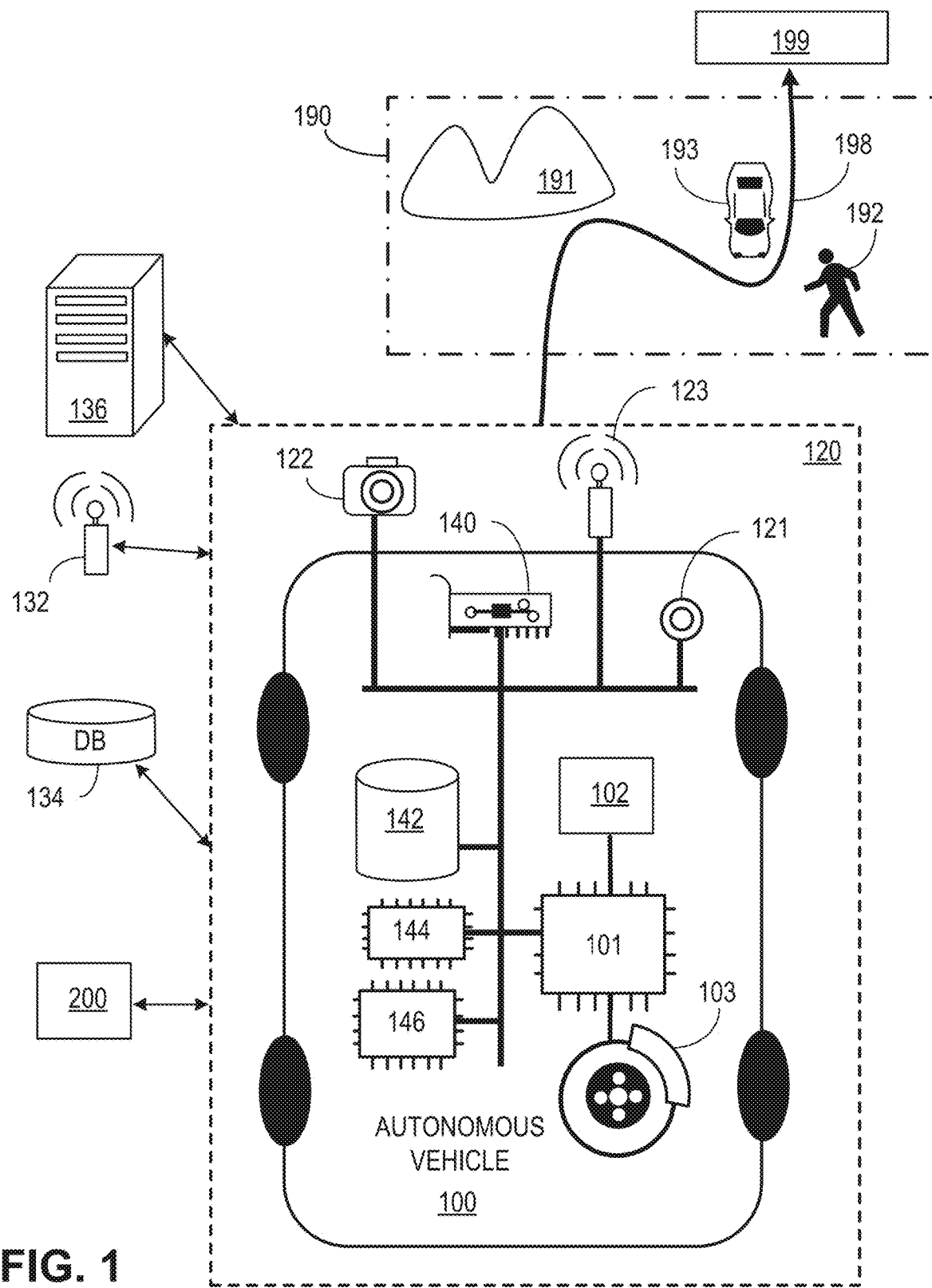
FIG. 1 shows an example of an AV having autonomous capability.

In the following description, for the purposes of explanation, numerous specific details are set forth in order to provide a thorough understanding of the present invention. It will be apparent, however, that the present invention can be practiced without these specific details. In other instances, well-known structures and devices are shown in block diagram form in order to avoid unnecessarily obscuring the present invention.

In the drawings, specific arrangements or orderings of schematic elements, such as those representing devices, modules, instruction blocks and data elements, are shown for ease of description. However, it should be understood by those skilled in the art that the specific ordering or arrangement of the schematic elements in the drawings is not meant to imply that a particular order or sequence of processing, or separation of processes, is required. Further, the inclusion of a schematic element in a drawing is not meant to imply that such element is required in all embodiments or that the features represented by such element may not be included in or combined with other elements in some embodiments.

Further, in the drawings, where connecting elements, such as solid or dashed lines or arrows, are used to illustrate a connection, relationship, or association between or among two or more other schematic elements, the absence of any such connecting elements is not meant to imply that no connection, relationship, or association can exist. In other words, some connections, relationships, or associations between elements are not shown in the drawings so as not to obscure the disclosure. In addition, for ease of illustration, a single connecting element is used to represent multiple connections, relationships or associations between elements. For example, where a connecting element represents a communication of signals, data, or instructions, it should be understood by those skilled in the art that such element represents one or multiple signal paths (e.g., a bus), as may be needed, to affect the communication.

Reference will now be made in detail to embodiments, examples of which are illustrated in the accompanying drawings. In the following detailed description, numerous specific details are set forth in order to provide a thorough understanding of the various described embodiments. However, it will be apparent to one of ordinary skill in the art that the various described embodiments may be practiced without these specific details. In other instances, well-known methods, procedures, components, circuits, and networks have not been described in detail so as not to unnecessarily obscure aspects of the embodiments.

Several features are described hereafter that can each be used independently of one another or with any combination of other features. However, any individual feature may not address any of the problems discussed above or might only address one of the problems discussed above. Some of the problems discussed above might not be fully addressed by any of the features described herein. Although headings are provided, information related to a particular heading, but not found in the section having that heading, may also be found elsewhere in this description. Embodiments are described herein according to the following outline:

1. General Overview
   2. System Overview
   3. AV Architecture
   4. AV Inputs
   5. Path Planning
   6. Lane Detection and Localization

General Overview

A vehicle (such as an AV) utilizes onboard sensors to collect information about other vehicles on a road for the purpose of determining its own location. For example, the vehicle uses onboard cameras, Light Detection and Ranging (LiDAR), RADAR, or other sensors to determine a pose of other vehicles on the road. Using the sensed information about the other vehicles, the vehicle estimates a geometry of a portion of the road, such as a lane of the road. The vehicle compares the determined geometry of the portion of the road with map data to match the portion of the road with the map data. Based on the match, the vehicle determines its location, orientation, or other characteristics used to localize the vehicle on the road.

Some of the advantages of these techniques include improved vehicle localization and navigation. For example, the described technology allows a vehicle to perform localization without relying on landmarks, thereby improving localization in areas having few landmarks (e.g., highways), and in situations where landmarks (or sensors used to detect the landmarks) are obstructed. It will be understood that, as used herein, "localization" refers to the identification of the pose (e.g., the location and orientation) of a vehicle with respect to identified map data.

In this manner, the localization techniques described here complement other localization techniques, and the vehicle can be configured to select an optimal localization technique based on features of the vehicle's environment or the state of its sensors. By improving localization, the techniques described here allow for safer, more robust navigation.

System Overview

FIG. 1 shows an example of an AV 100 having autonomous capability.

As used herein, the term "autonomous capability" refers to a function, feature, or facility that enables a vehicle to be partially or fully operated without real-time human intervention, including without limitation fully AVs, highly AVs, and conditionally AVs.

As used herein, an AV is a vehicle that possesses autonomous capability.

As used herein, "vehicle" includes means of transportation of goods or people. For example, cars, buses, trains, airplanes, drones, trucks, boats, ships, submersibles, dirigibles, etc. A driverless car is an example of a vehicle.

As used herein, "trajectory" refers to a path or route to navigate an AV from a first spatiotemporal location to second spatiotemporal location. In an embodiment, the first spatiotemporal location is referred to as the initial or starting location and the second spatiotemporal location is referred to as the destination, final location, goal, goal position, or goal location. In some examples, a trajectory is made up of one or more segments (e.g., sections of road) and each segment is made up of one or more blocks (e.g., portions of a lane or intersection). In an embodiment, the spatiotemporal locations correspond to real-world locations. For example, the spatiotemporal locations are pick-up or drop-off locations to pick-up or drop-off persons or goods.

As used herein, "sensor(s)" includes one or more hardware components that detect information about the environment surrounding the sensor. Some of the hardware components can include sensing components (e.g., image sensors, biometric sensors), transmitting and/or receiving components (e.g., laser or radio frequency wave transmitters and receivers), electronic components such as analog-to-digital converters, a data storage device (such as a random-access memory (RAM) and/or a non-volatile storage), software or firmware components and data processing components such as an ASIC (application-specific integrated circuit), a microprocessor and/or a microcontroller.

As used herein, a "scene description" is a data structure (e.g., list) or data stream that includes one or more classified or labeled objects detected by one or more sensors on the AV vehicle or provided by a source external to the AV.

As used herein, a "road" is a physical area that can be traversed by a vehicle, and may correspond to a named thoroughfare (e.g., city street, interstate freeway, etc.) or may correspond to an unnamed thoroughfare (e.g., a driveway in a house or office building, a section of a parking lot, a section of a vacant lot, a dirt path in a rural area, etc.). Because some vehicles (e.g., 4-wheel-drive pickup trucks, sport utility vehicles, etc.) are capable of traversing a variety of physical areas not specifically adapted for vehicle travel, a "road" may be a physical area not formally defined as a thoroughfare by any municipality or other governmental or administrative body.

As used herein, a "lane" is a portion of a road that can be traversed by a vehicle. A lane is sometimes identified based on lane markings. For example, a lane may correspond to most or all of the space between lane markings, or may correspond to only some (e.g., less than 50%) of the space between lane markings. For example, a road having lane markings spaced far apart might accommodate two or more vehicles between the markings, such that one vehicle can pass the other without traversing the lane markings, and thus could be interpreted as having a lane narrower than the space between the lane markings, or having two lanes between the lane markings. A lane could also be interpreted in the absence of lane markings. For example, a lane may be defined based on physical features of an environment, e.g., rocks and trees along a thoroughfare in a rural area or, e.g., natural obstructions to be avoided in an undeveloped area. A lane could also be interpreted independent of lane markings or physical features. For example, a lane could be interpreted based on an arbitrary path free of obstructions in an area that otherwise lacks features that would be interpreted as lane boundaries. In an example scenario, an AV could interpret a lane through an obstruction-free portion of a field or empty lot. In another example scenario, an AV could interpret a lane through a wide (e.g., wide enough for two or more lanes) road that does not have lane markings. In this scenario, the AV could communicate information about the lane to other AVs so that the other AVs can use the same lane information to coordinate path planning among themselves.

The term "over-the-air (OTA) client" includes any AV, or any electronic device (e.g., computer, controller, IoT device, electronic control unit (ECU)) that is embedded in, coupled to, or in communication with an AV.

The term "OTA update" means any update, change, deletion or addition to software, firmware, data or configuration settings, or any combination thereof, that is delivered to an OTA client using proprietary and/or standardized wireless communications technology, including but not limited to: cellular mobile communications (e.g., 2G, 3G, 4G, 5G), radio wireless area networks (e.g., WiFi) and/or satellite Internet.

The term "edge node" means one or more edge devices coupled to a network that provide a portal for communication with AVs and can communicate with other edge nodes and a cloud based computing platform, for scheduling and delivering OTA updates to OTA clients.

The term "edge device" means a device that implements an edge node and provides a physical wireless access point (AP) into enterprise or service provider (e.g., VERIZON, AT&T) core networks. Examples of edge devices include but are not limited to: computers, controllers, transmitters, routers, routing switches, integrated access devices (IADs), multiplexers, metropolitan area network (MAN) and wide area network (WAN) access devices.

"One or more" includes a function being performed by one element, a function being performed by more than one element, e.g., in a distributed fashion, several functions being performed by one element, several functions being performed by several elements, or any combination of the above.

It will also be understood that, although the terms first, second, etc. are, in some instances, used herein to describe various elements, these elements should not be limited by these terms. These terms are only used to distinguish one element from another. For example, a first contact could be termed a second contact, and, similarly, a second contact could be termed a first contact, without departing from the scope of the various described embodiments. The first contact and the second contact are both contacts, but they are not the same contact.

The terminology used in the description of the various described embodiments herein is for the purpose of describing particular embodiments only and is not intended to be limiting. As used in the description of the various described embodiments and the appended claims, the singular forms "a," "an" and "the" are intended to include the plural forms as well, unless the context clearly indicates otherwise. It will also be understood that the term "and/or" as used herein refers to and encompasses any and all possible combinations of one or more of the associated listed items. It will be further understood that the terms "includes," "including," "comprises," and/or "comprising," when used in this description, specify the presence of stated features, integers, steps, operations, elements, and/or components, but do not preclude the presence or addition of one or more other features, integers, steps, operations, elements, components, and/or groups thereof.

As used herein, the term "if" is, optionally, construed to mean "when" or "upon" or "in response to determining" or "in response to detecting," depending on the context. Similarly, the phrase "if it is determined" or "if [a stated condition or event] is detected" is, optionally, construed to mean "upon determining" or "in response to determining" or "upon detecting [the stated condition or event]" or "in response to detecting [the stated condition or event]," depending on the context.

As used herein, an AV system refers to the AV along with the array of hardware, software, stored data, and data generated in real-time that supports the operation of the AV. In an embodiment, the AV system is incorporated within the AV. In an embodiment, the AV system is spread across several locations. For example, some of the software of the AV system is implemented on a cloud computing environment.

In general, this document describes technologies applicable to any vehicles that have one or more autonomous capabilities including fully AVs, highly AVs, and conditionally AVs, such as so-called Level 5, Level 4 and Level 3 vehicles, respectively (see SAE International's standard J3016: Taxonomy and Definitions for Terms Related to On-Road Motor Vehicle Automated Driving Systems, which is incorporated by reference in its entirety, for more details on the classification of levels of autonomy in vehicles). The technologies described in this document are also applicable to partially AVs and driver assisted vehicles, such as so-called Level 2 and Level 1 vehicles (see SAE International's standard J3016: Taxonomy and Definitions for Terms Related to On-Road Motor Vehicle Automated Driving Systems). In an embodiment, one or more of the Level 1, 2, 3, 4 and 5 vehicle systems can automate certain vehicle operations (e.g., steering, braking, and using maps) under certain operating conditions based on processing of sensor inputs. The technologies described in this document can benefit vehicles in any levels, ranging from fully AVs to human-operated vehicles.

AVs have advantages over vehicles that require a human driver. One advantage is safety. For example, in 2016, the United States experienced 6 million automobile accidents, 2.4 million injuries, 40,000 fatalities, and 13 million vehicles in crashes, estimated at a societal cost of $910+ billion. U.S. traffic fatalities per 100 million miles traveled have been reduced from about six to about one from 1965 to 2015, in part due to additional safety measures deployed in vehicles. For example, an additional half second of warning that a crash is about to occur is believed to mitigate 60% of front-to-rear crashes. However, passive safety features (e.g., seat belts, airbags) have likely reached their limit in improving this number. Thus, active safety measures, such as automated control of a vehicle, are the likely next step in improving these statistics. Because human drivers are believed to be responsible for a critical pre-crash event in 95% of crashes, automated driving systems are likely to achieve better safety outcomes, e.g., by reliably recognizing and avoiding critical situations better than humans; making better decisions, obeying traffic laws, and predicting future events better than humans; and reliably controlling a vehicle better than a human.

Referring to FIG. 1, an AV system 120 operates the AV 100 along a trajectory 198 through an environment 190 to a destination 199 (sometimes referred to as a final location) while avoiding objects (e.g., natural obstructions 191, vehicles 193, pedestrians 192, cyclists, and other obstacles) and obeying rules of the road (e.g., rules of operation or driving preferences).

In an embodiment, the AV system 120 includes devices 101 that are instrumented to receive and act on operational commands from the computer processors 146. We use the term "operational command" to mean an executable instruction (or set of instructions) that causes a vehicle to perform an action (e.g., a driving maneuver). Operational commands can, without limitation, including instructions for a vehicle to start moving forward, stop moving forward, start moving backward, stop moving backward, accelerate, decelerate, perform a left turn, and perform a right turn. In an embodiment, computing processors 146 are similar to the processor 204 described below in reference to FIG. 2. Examples of devices 101 include a steering control 102, brakes 103, gears, accelerator pedal or other acceleration control mechanisms, windshield wipers, side-door locks, window controls, and turn-indicators.

In an embodiment, the AV system 120 includes sensors 121 for measuring or inferring properties of state or condition of the AV 100, such as the AV's position, linear and angular velocity and acceleration, and heading (e.g., an orientation of the leading end of AV 100). Example of sensors 121 are GPS, inertial measurement units (IMU) that measure both vehicle linear accelerations and angular rates, wheel speed sensors for measuring or estimating wheel slip ratios, wheel brake pressure or braking torque sensors, engine torque or wheel torque sensors, and steering angle and angular rate sensors.

In an embodiment, the sensors 121 also include sensors for sensing or measuring properties of the AV's environment. For example, monocular or stereo video cameras 122 in the visible light, infrared or thermal (or both) spectra, LiDAR 123, RADAR, ultrasonic sensors, time-of-flight (TOF) depth sensors, speed sensors, temperature sensors, humidity sensors, and precipitation sensors.

In an embodiment, the AV system 120 includes a data storage unit 142 and memory 144 for storing machine instructions associated with computer processors 146 or data collected by sensors 121. In an embodiment, the data storage unit 142 is similar to the ROM 208 or storage device 210 described below in relation to FIG. 2. In an embodiment, memory 144 is similar to the main memory 206 described below. In an embodiment, the data storage unit 142 and memory 144 store historical, real-time, and/or predictive information about the environment 190. In an embodiment, the stored information includes maps, driving performance, traffic congestion updates or weather conditions. In an embodiment, data relating to the environment 190 is transmitted to the AV 100 via a communications channel from a remotely located database 134.

In an embodiment, the AV system 120 includes communications devices 140 for communicating measured or inferred properties of other vehicles' states and conditions, such as positions, linear and angular velocities, linear and angular accelerations, and linear and angular headings to the AV 100. These devices include Vehicle-to-Vehicle (V2V)

and Vehicle-to-Infrastructure (V2I) communication devices and devices for wireless communications over point-to-point or ad hoc networks or both. In an embodiment, the communications devices 140 communicate across the electromagnetic spectrum (including radio and optical communications) or other media (e.g., air and acoustic media). A combination of Vehicle-to-Vehicle (V2V) Vehicle-to-Infrastructure (V2I) communication (and, in some embodiments, one or more other types of communication) is sometimes referred to as Vehicle-to-Everything (V2X) communication. V2X communication typically conforms to one or more communications standards for communication with, between, and among AVs.

In an embodiment, the communication devices 140 include communication interfaces. For example, wired, wireless, WiMAX, Wi-Fi, Bluetooth, satellite, cellular, optical, near field, infrared, or radio interfaces. The communication interfaces transmit data from a remotely located database 134 to AV system 120. In an embodiment, the remotely located database 134 is embedded in a cloud computing environment. The communication devices 140 transmit data collected from sensors 121 or other data related to the operation of AV 100 to the remotely located database 134. In an embodiment, communication devices 140 transmit information that relates to teleoperations to the AV 100. In some embodiments, the AV 100 communicates with other remote (e.g., "cloud") servers 136.

In an embodiment, the remotely located database 134 also stores and transmits digital data (e.g., storing data such as road and street locations). Such data is stored on the memory 144 on the AV 100, or transmitted to the AV 100 via a communications channel from the remotely located database 134.

In an embodiment, the remotely located database 134 stores and transmits historical information about driving properties (e.g., speed and acceleration profiles) of vehicles that have previously traveled along trajectory 198 at similar times of day. In one implementation, such data can be stored on the memory 144 on the AV 100, or transmitted to the AV 100 via a communications channel from the remotely located database 134.

Computer processors 146 located on the AV 100 algorithmically generate control actions based on both real-time sensor data and prior information, allowing the AV system 120 to execute its autonomous driving capabilities.

In an embodiment, the AV system 120 includes computer peripherals 132 coupled to computer processors 146 for providing information and alerts to, and receiving input from, a user (e.g., an occupant or a remote user) of the AV 100. In an embodiment, peripherals 132 are similar to the display 212, input device 214, and cursor controller 216 discussed below in reference to FIG. 2. The coupling is wireless or wired. Any two or more of the interface devices can be integrated into a single device.

In an embodiment, the AV system 120 receives and enforces a privacy level of a passenger, e.g., specified by the passenger or stored in a profile associated with the passenger. The privacy level of the passenger determines how particular information associated with the passenger (e.g., passenger comfort data, biometric data, etc.) is permitted to be used, stored in the passenger profile, and/or stored on the cloud server 136 and associated with the passenger profile. In an embodiment, the privacy level specifies particular information associated with a passenger that is deleted once the ride is completed. In an embodiment, the privacy level specifies particular information associated with a passenger and identifies one or more entities that are authorized to access the information. Examples of specified entities that are authorized to access information can include other AVs, third-party AV systems, or any entity that could potentially access the information.

A privacy level of a passenger can be specified at one or more levels of granularity. In an embodiment, a privacy level identifies specific information to be stored or shared. In an embodiment, the privacy level applies to all the information associated with the passenger such that the passenger can specify that none of her personal information is stored or shared. Specification of the entities that are permitted to access particular information can also be specified at various levels of granularity. Various sets of entities that are permitted to access particular information can include, for example, other AVs, cloud servers 136, specific third-party AV systems, etc.

In an embodiment, the AV system 120 or the cloud server 136 determines if certain information associated with a passenger can be accessed by the AV 100 or another entity. For example, a third-party AV system that attempts to access passenger input related to a particular spatiotemporal location must obtain authorization, e.g., from the AV system 120 or the cloud server 136, to access the information associated with the passenger. For example, the AV system 120 uses the passenger's specified privacy level to determine whether the passenger input related to the spatiotemporal location can be presented to the third-party AV system, the AV 100, or to another AV. This enables the passenger's privacy level to specify which other entities are allowed to receive data about the passenger's actions or other data associated with the passenger.

Figure 2:
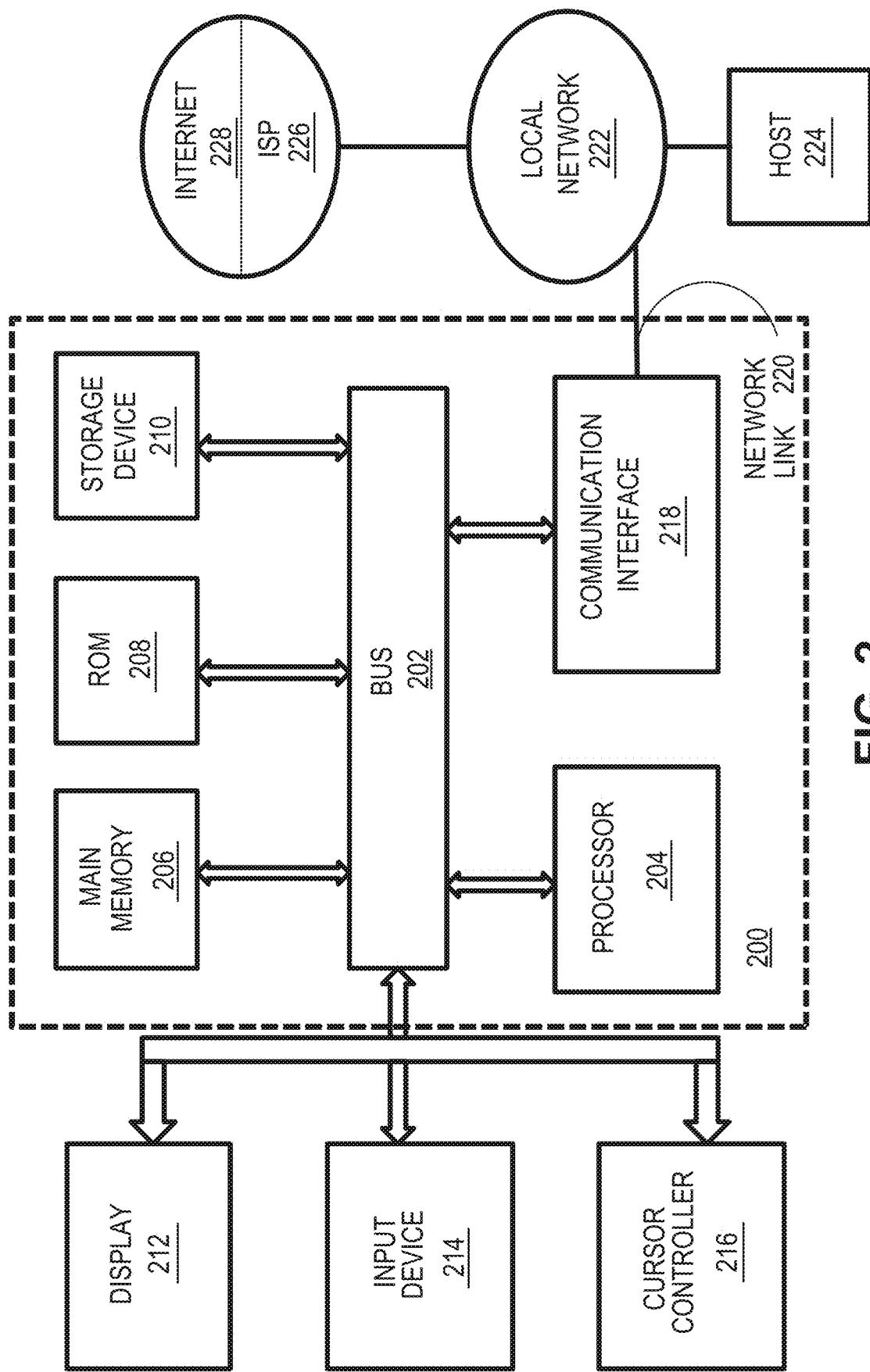
FIG. 2 shows a computer system.

FIG. 2 shows a computer system 200. In an implementation, the computer system 200 is a special-purpose computing device. The special-purpose computing device is hard-wired to perform the techniques or includes digital electronic devices such as one or more ASICs or field programmable gate arrays (FPGAs) that are persistently programmed to perform the techniques, or can include one or more general-purpose hardware processors programmed to perform the techniques pursuant to program instructions in firmware, memory, other storage, or a combination. Such special-purpose computing devices can also combine custom hard-wired logic, ASICs, or FPGAs with custom programming to accomplish the techniques. In various embodiments, the special-purpose computing devices are desktop computer systems, portable computer systems, handheld devices, network devices or any other device that incorporates hard-wired and/or program logic to implement the techniques.

In an embodiment, the computer system 200 includes a bus 202 or other communication mechanism for communicating information, and a processor 204 coupled with a bus 202 for processing information. The processor 204 is, for example, a general-purpose microprocessor. The computer system 200 also includes a main memory 206, such as a RAM or other dynamic storage device, coupled to the bus 202 for storing information and instructions to be executed by processor 204. In one implementation, the main memory 206 is used for storing temporary variables or other intermediate information during execution of instructions to be executed by the processor 204. Such instructions, when stored in non-transitory storage media accessible to the processor 204, render the computer system 200 into a special-purpose machine that is customized to perform the operations specified in the instructions.

In an embodiment, the computer system 200 further includes a read only memory (ROM) 208 or other static storage device coupled to the bus 202 for storing static information and instructions for the processor 204. A storage device 210, such as a magnetic disk, optical disk, solid-state drive, or three-dimensional cross point memory is provided and coupled to the bus 202 for storing information and instructions.

In an embodiment, the computer system 200 is coupled via the bus 202 to a display 212, such as a cathode ray tube (CRT), a liquid crystal display (LCD), plasma display, light emitting diode (LED) display, or an organic light emitting diode (OLED) display for displaying information to a computer user. An input device 214, including alphanumeric and other keys, is coupled to bus 202 for communicating information and command selections to the processor 204. Another type of user input device is a cursor controller 216, such as a mouse, a trackball, a touch-enabled display, or cursor direction keys for communicating direction information and command selections to the processor 204 and for controlling cursor movement on the display 212. This input device typically has two degrees of freedom in two axes, a first axis (e.g., x-axis) and a second axis (e.g., y-axis), that allows the device to specify positions in a plane.

According to one embodiment, the techniques herein are performed by the computer system 200 in response to the processor 204 executing one or more sequences of one or more instructions contained in the main memory 206. Such instructions are read into the main memory 206 from another storage medium, such as the storage device 210. Execution of the sequences of instructions contained in the main memory 206 causes the processor 204 to perform the process steps described herein. In alternative embodiments, hard-wired circuitry is used in place of or in combination with software instructions.

The term "storage media" as used herein refers to any non-transitory media that store data and/or instructions that cause a machine to operate in a specific fashion. Such storage media includes non-volatile media and/or volatile media. Non-volatile media includes, for example, optical disks, magnetic disks, solid-state drives, or three-dimensional cross point memory, such as the storage device 210. Volatile media includes dynamic memory, such as the main memory 206. Common forms of storage media include, for example, a floppy disk, a flexible disk, hard disk, solid-state drive, magnetic tape, or any other magnetic data storage medium, a CD-ROM, any other optical data storage medium, any physical medium with patterns of holes, a RAM, a PROM, and EPROM, a FLASH-EPROM, NV-RAM, or any other memory chip or cartridge.

Storage media is distinct from but may be used in conjunction with transmission media. Transmission media participates in transferring information between storage media. For example, transmission media includes coaxial cables, copper wire and fiber optics, including the wires that comprise the bus 202. Transmission media can also take the form of acoustic or light waves, such as those generated during radio-wave and infrared data communications.

In an embodiment, various forms of media are involved in carrying one or more sequences of one or more instructions to the processor 204 for execution. For example, the instructions are initially carried on a magnetic disk or solid-state drive of a remote computer. The remote computer loads the instructions into its dynamic memory and send the instructions over a telephone line using a modem. A modem local to the computer system 200 receives the data on the telephone line and use an infrared transmitter to convert the data to an infrared signal. An infrared detector receives the data carried in the infrared signal and appropriate circuitry places the data on the bus 202. The bus 202 carries the data to the main memory 206, from which processor 204 retrieves and executes the instructions. The instructions received by the main memory 206 can optionally be stored on the storage device 210 either before or after execution by processor 204.

The computer system 200 also includes a communication interface 218 coupled to the bus 202. The communication interface 218 provides a two-way data communication coupling to a network link 220 that is connected to a local network 222. For example, the communication interface 218 is an integrated service digital network (ISDN) card, cable modem, satellite modem, or a modem to provide a data communication connection to a corresponding type of telephone line. As another example, the communication interface 218 is a local area network (LAN) card to provide a data communication connection to a compatible LAN. In some implementations, wireless links are also implemented. In any such implementation, the communication interface 218 sends and receives electrical, electromagnetic, or optical signals that carry digital data streams representing various types of information.

The network link 220 typically provides data communication through one or more networks to other data devices. For example, the network link 220 provides a connection through the local network 222 to a host computer 224 or to a cloud data center or equipment operated by an Internet Service Provider (ISP) 226. The ISP 226 in turn provides data communication services through the world-wide packet data communication network now commonly referred to as the "Internet" 228. The local network 222 and Internet 228 both use electrical, electromagnetic or optical signals that carry digital data streams. The signals through the various networks and the signals on the network link 220 and through the communication interface 218, which carry the digital data to and from the computer system 200, are example forms of transmission media. In an embodiment, the network 220 contains the cloud or a part of the cloud.

The computer system 200 sends messages and receives data, including program code, through the network(s), the network link 220, and the communication interface 218. In an embodiment, the computer system 200 receives code for processing. The received code is executed by the processor 204 as it is received, and/or stored in storage device 210, or other non-volatile storage for later execution.

AV Architecture

Figure 3:
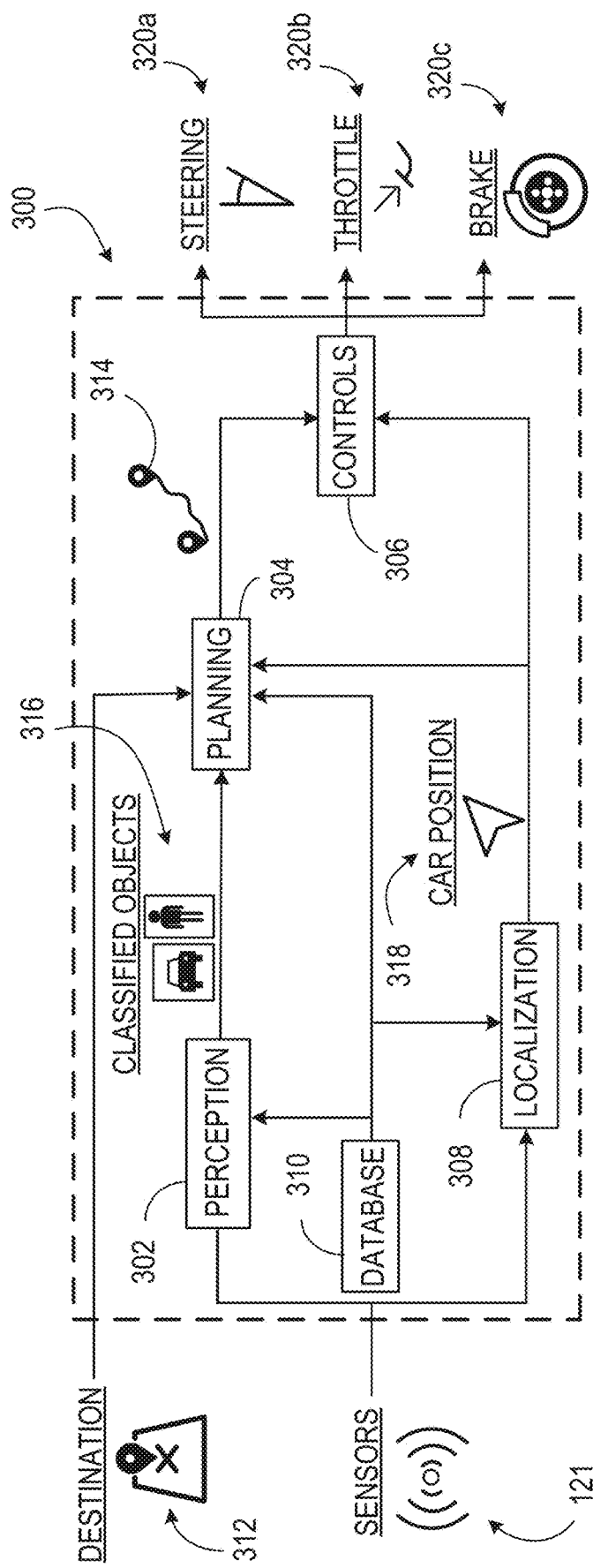
FIG. 3 shows an example architecture for an AV.

FIG. 3 shows an example architecture 300 for an AV (e.g., the AV 100 shown in FIG. 1). The architecture 300 includes a perception circuit 302 (sometimes referred to as a perception module), a planning circuit 304 (sometimes referred to as a planning module), a control circuit 306 (sometimes referred to as a control module), a localization circuit 308 (sometimes referred to as a localization module), and a database circuit 310 (sometimes referred to as a database module). Each circuit plays a role in the operation of the AV 100. Together, the circuits 302, 304, 306, 308, and 310 can be part of the AV system 120 shown in FIG. 1. In some embodiments, even though the version elements are described as "circuits," any of the circuits 302, 304, 306, 308, and 310 are a combination of computer software (e.g., executable code stored on a computer-readable medium) and computer hardware (e.g., one or more microprocessors, microcontrollers, application-specific integrated circuits [ASICs]), hardware memory devices, other types of integrated circuits, other types of computer hardware, or a combination of any or all of these things). Each of the circuits 302, 304, 306, 308, and 310 is sometimes referred to as a processing circuit or a processing module (e.g., computer hardware, computer software, or a combination of the two). A combination of any or all of the circuits 302, 304, 306, 308, and 310 is also an example of a processing circuit or a processing module.

In use, the planning circuit 304 receives data representing a destination 312 and determines data representing a trajectory 314 (sometimes referred to as a route) that can be traveled by the AV 100 to reach (e.g., arrive at) the destination 312. In order for the planning circuit 304 to determine the data representing the trajectory 314, the planning circuit 304 receives data from the perception circuit 302, the localization circuit 308, and the database circuit 310.

The perception circuit 302 identifies nearby physical objects using one or more sensors 121, e.g., as also shown in FIG. 1. The objects are classified (e.g., grouped into types such as pedestrian, bicycle, automobile, traffic sign, etc.) and a scene description including the classified objects 316 is provided to the planning circuit 304.

The planning circuit 304 also receives data representing the AV position 318 from the localization circuit 308. The localization circuit 308 determines the AV position and orientation (e.g., the pose of the AV) by using data from the sensors 121 and data from the database circuit 310 (e.g., a geographic data) to calculate a position. For example, the localization circuit 308 uses data from a GNSS (Global Navigation Satellite System) sensor and geographic data to calculate a longitude and latitude of the AV. In an embodiment, data used by the localization circuit 308 includes high-precision maps of the roadway geometric properties, maps describing road network connectivity properties, maps describing roadway physical properties (such as traffic speed, traffic volume, the number of vehicular and cyclist traffic lanes, lane width, lane traffic directions, or lane marker types and locations, or combinations of them), and maps describing the spatial locations of road features such as crosswalks, traffic signs or other travel signals of various types. In an embodiment, the high-precision maps are constructed by adding data through automatic or manual annotation to low-precision maps.

The control circuit 306 receives the data representing the trajectory 314 and the data representing the AV position 318 and operates the control functions 320a-c (e.g., steering, throttling, braking, ignition) of the AV in a manner that will cause the AV 100 to travel the trajectory 314 to the destination 312. For example, if the trajectory 314 includes a left turn, the control circuit 306 will operate the control functions 320a-c in a manner such that the steering angle of the steering function will cause the AV 100 to turn left and the throttling and braking will cause the AV 100 to pause and wait for passing pedestrians or vehicles before the turn is made.

AV Inputs

Figure 4:
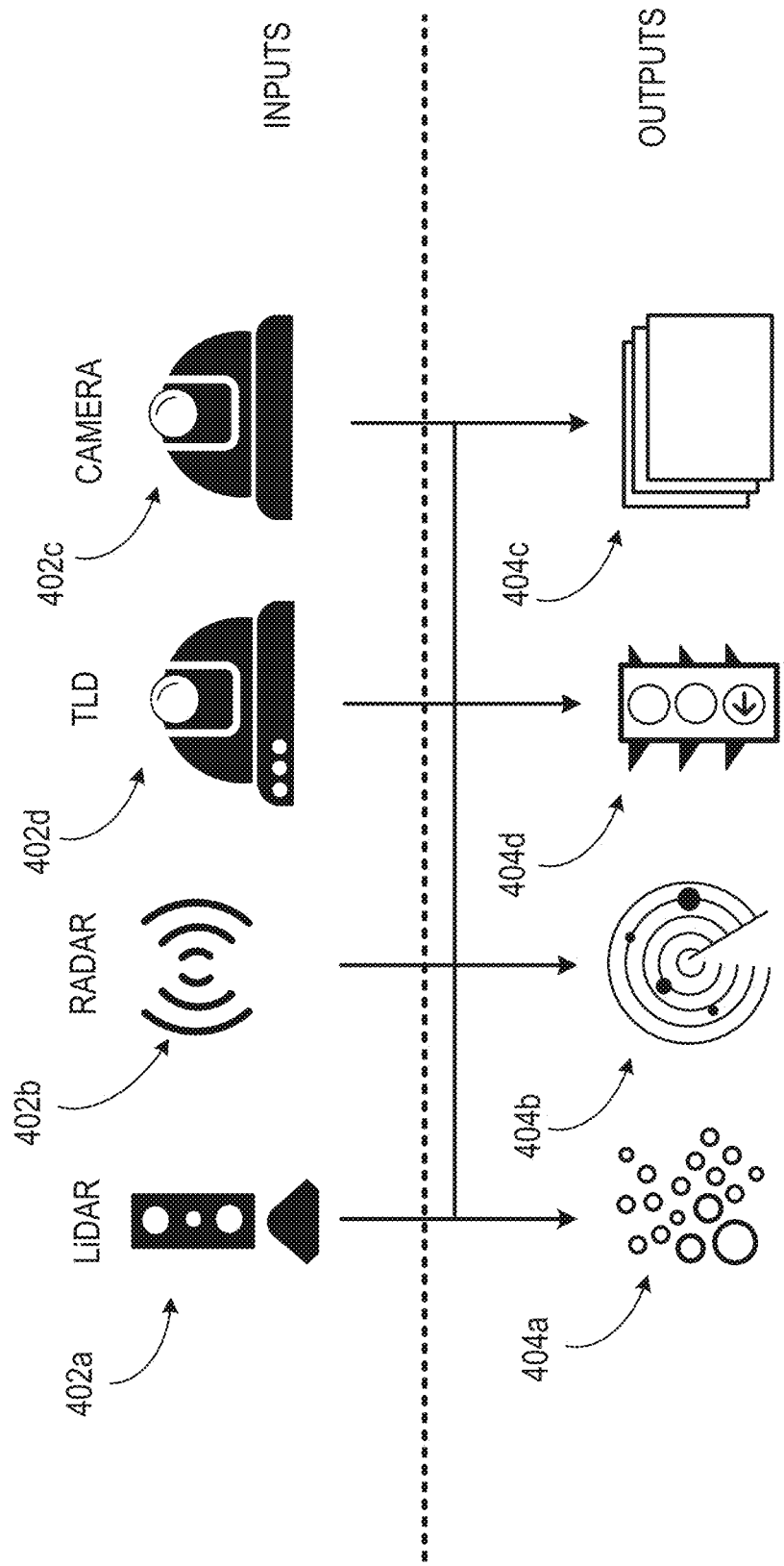
FIG. 4 shows an example of inputs and outputs that can be used by a perception circuit.

FIG. 4 shows an example of inputs 402a-d (e.g., sensors 121 shown in FIG. 1) and outputs 404a-d (e.g., sensor data) that is used by the perception circuit 302 (FIG. 3). One input 402a is a LiDAR system (e.g., LiDAR 123 shown in FIG. 1). LiDAR is a technology that uses light (e.g., bursts of light such as infrared light) to obtain data about physical objects in its line of sight. A LiDAR system produces LiDAR data as output 404a. For example, LiDAR data is collections of 3D or 2D points (also known as point clouds) that are used to construct a representation of the environment 190.

Another input 402b is a RADAR system. RADAR is a technology that uses radio waves to obtain data about nearby physical objects. RADARs can obtain data about objects not within the line of sight of a LiDAR system. A RADAR system produces RADAR data as output 404b. For example, RADAR data are one or more radio frequency electromagnetic signals that are used to construct a representation of the environment 190.

Another input 402c is a camera system. A camera system uses one or more cameras (e.g., digital cameras using a light sensor such as a charge-coupled device [CCD]) to obtain information about nearby physical objects. A camera system produces camera data as output 404c. Camera data often takes the form of image data (e.g., data in an image data format such as RAW, JPEG, PNG, etc.). In some examples, the camera system has multiple independent cameras, e.g., for the purpose of stereopsis (stereo vision), which enables the camera system to perceive depth. Although the objects perceived by the camera system are described here as "nearby," this is relative to the AV. In some embodiments, the camera system is configured to "see" objects far, e.g., up to a kilometer or more ahead of the AV. Accordingly, in some embodiments, the camera system has features such as sensors and lenses that are optimized for perceiving objects that are far away.

Another input 402d is a traffic light detection (TLD) system. A TLD system uses one or more cameras to obtain information about traffic lights, street signs, and other physical objects that provide visual navigation information. A TLD system produces TLD data as output 404d. TLD data often takes the form of image data (e.g., data in an image data format such as RAW, JPEG, PNG, etc.). A TLD system differs from a system incorporating a camera in that a TLD system uses a camera with a wide field of view (e.g., using a wide-angle lens or a fish-eye lens) in order to obtain information about as many physical objects providing visual navigation information as possible, so that the AV 100 has access to all relevant navigation information provided by these objects. For example, the viewing angle of the TLD system is about 120 degrees or more.

In some embodiments, outputs 404a-d are combined using a sensor fusion technique. Thus, either the individual outputs 404a-d are provided to other systems of the AV 100 (e.g., provided to a planning circuit 304 as shown in FIG. 3), or the combined output can be provided to the other systems, either in the form of a single combined output or multiple combined outputs of the same type (e.g., using the same combination technique or combining the same outputs or both) or different types type (e.g., using different respective combination techniques or combining different respective outputs or both). In some embodiments, an early fusion technique is used. An early fusion technique is characterized by combining outputs before one or more data processing steps are applied to the combined output. In some embodiments, a late fusion technique is used. A late fusion technique is characterized by combining outputs after one or more data processing steps are applied to the individual outputs.

Path Planning

Figure 5:
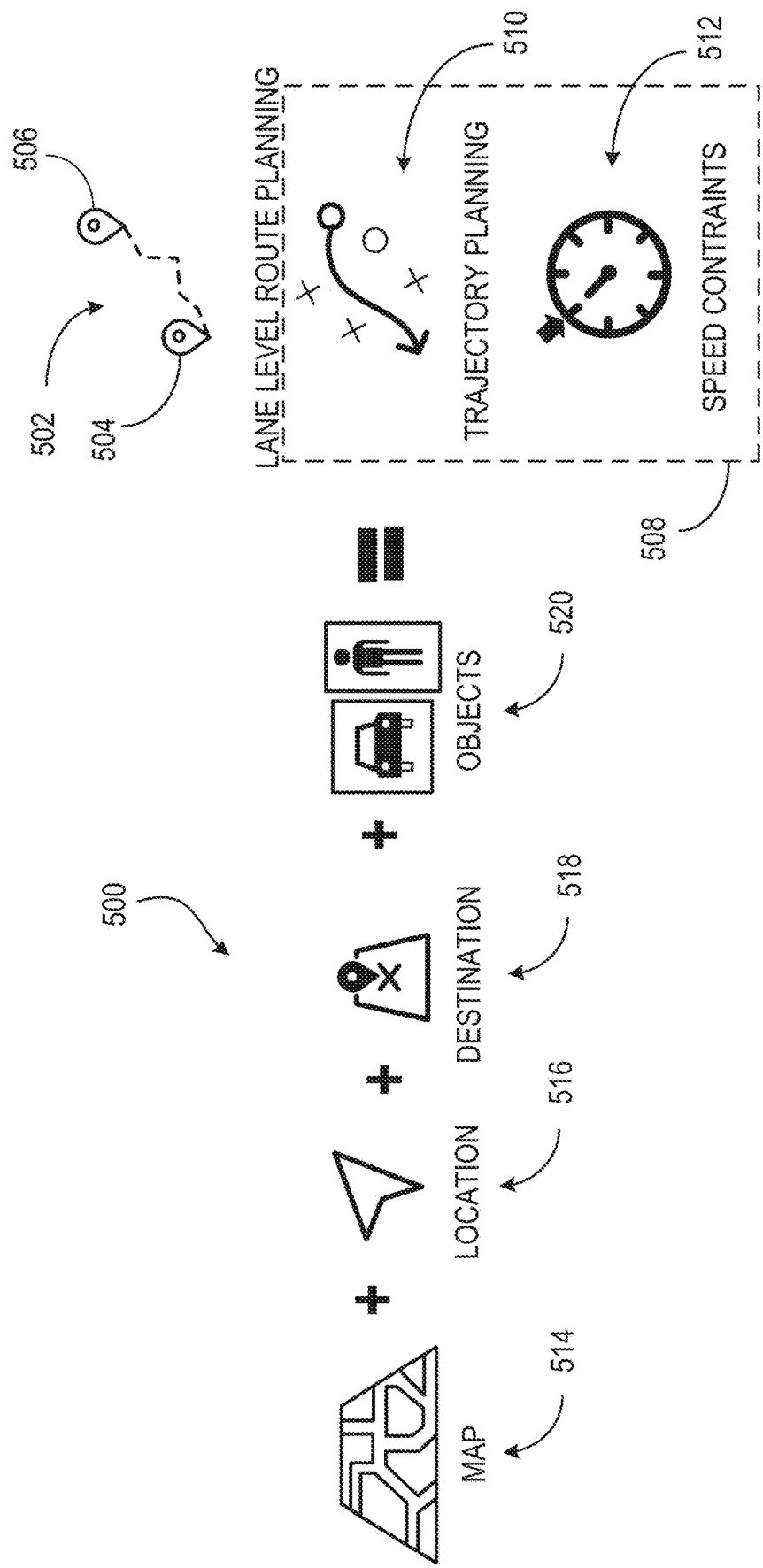
FIG. 5 shows a block diagram of the relationships between inputs and outputs of a planning circuit.

FIG. 5 shows a block diagram 500 of the relationships between inputs and outputs of a planning circuit 304 (e.g., as shown in FIG. 3). In general, the output of a planning circuit 304 is a route 502 from a start point 504 (e.g., source location or initial location), and an end point 506 (e.g., destination or final location). The route 502 is typically defined by one or more segments. For example, a segment is a distance to be traveled over at least a portion of a street, road, highway, driveway, or other physical area appropriate for automobile travel. In some examples, e.g., if the AV 100 is an off-road capable vehicle such as a four-wheel-drive (4WD) or all-wheel-drive (AWD) car, SUV, pick-up truck, or the like, the route 502 includes "off-road" segments such as unpaved paths or open fields.

In addition to the route 502, a planning circuit also outputs lane-level route planning data 508. The lane-level route planning data 508 is used to traverse segments of the route 502 based on conditions of the segment at a particular time. For example, if the route 502 includes a multi-lane highway, the lane-level route planning data 508 includes trajectory planning data 510 that the AV 100 can use to choose a lane among the multiple lanes, e.g., based on whether an exit is approaching, whether one or more of the lanes have other vehicles, or other factors that vary over the course of a few minutes or less. Similarly, in some implementations, the lane-level route planning data 508 includes speed constraints 512 specific to a segment of the route 502. For example, if the segment includes pedestrians or un-expected traffic, the speed constraints 512 limit the AV 100 to a travel speed slower than an expected speed, e.g., a speed based on speed limit data for the segment.

In an embodiment, the inputs to the planning circuit 304 includes database data 514 (e.g., from the database circuit 310 shown in FIG. 3), current location data 516 (e.g., the AV position 318 shown in FIG. 3), destination data 518 (e.g., for the destination 312 shown in FIG. 3), and object data 520 (e.g., the classified objects 316 as perceived by the perception circuit 302 as shown in FIG. 3). In some embodiments, the database data 514 includes rules used in planning. Rules are specified using a formal language, e.g., using Boolean logic. In any given situation encountered by the AV 100, at least some of the rules will apply to the situation. A rule applies to a given situation if the rule has conditions that are met based on information available to the AV 100, e.g., information about the surrounding environment. Rules can have priority. For example, a rule that says, "if the road is a freeway, move to the leftmost lane" can have a lower priority than "if the exit is approaching within a mile, move to the rightmost lane."

Lane Detection and Localization

As noted with respect to FIG. 3 and FIG. 1, a localization circuit 308 determines the position of a vehicle (e.g., AV 100 of FIG. 1) such as an AV by using data from the sensors 121 and data from the database circuit 310 (e.g., a geographic data) to calculate a position of a vehicle. However, in some situations the one or more of the sensors' 121 fields of view are fully or partially obscured by an object such as another vehicle, a road feature such as a divider, or other environment features such as vegetation. In this situation, the sensors 121 are unable to receive data that is quantitatively or qualitatively sufficient for the AV system 120 to localize AV 100. For example, if the AV 100 is on a highway, then the sensors 121 will only detect the barriers or roadway adjacent to the highway. Such structures are, in many cases, generally uniform and so the sensors would not acquire a distinctive structure to localize AV 100. As another example, the AV 100 is surrounded by other vehicles that would impair the ability of the sensors to detect structures that are in the vicinity of the location of the vehicle.

Figure 6:
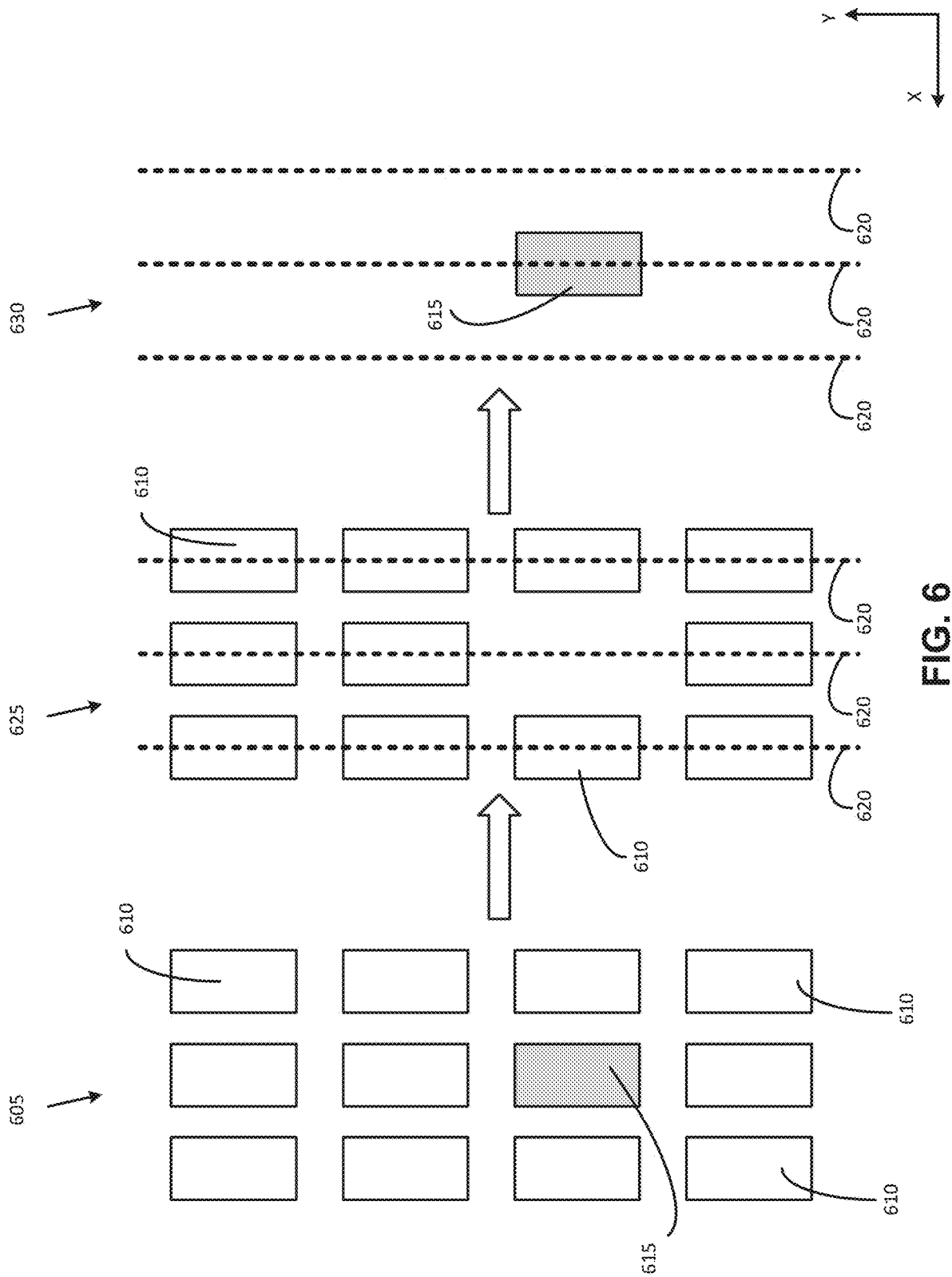
FIG. 6 shows an example of lane detection based on other vehicles, in accordance with various embodiments.
Figure 7:
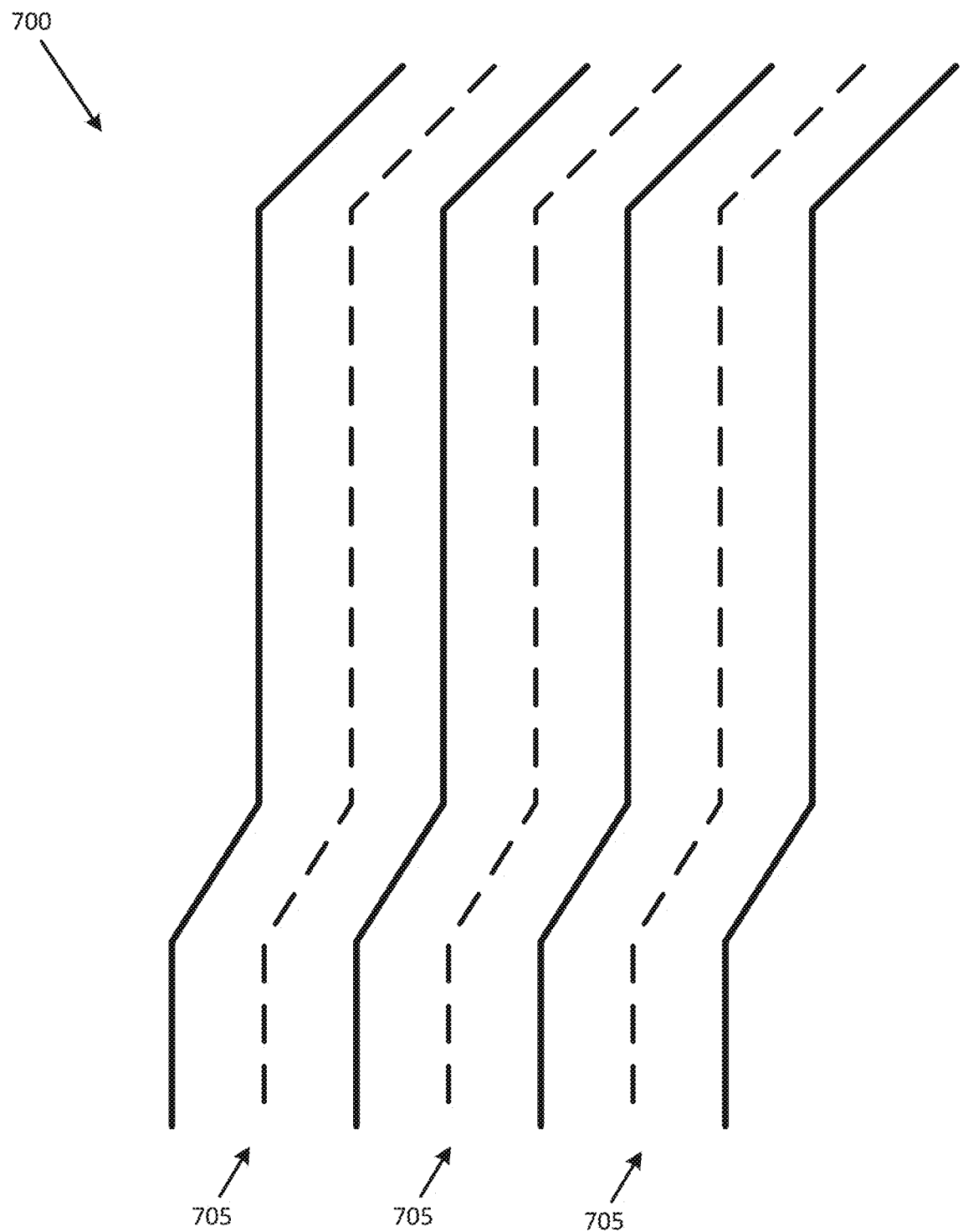
FIG. 7 shows an example of map data, in accordance with various embodiments.
Figure 8:
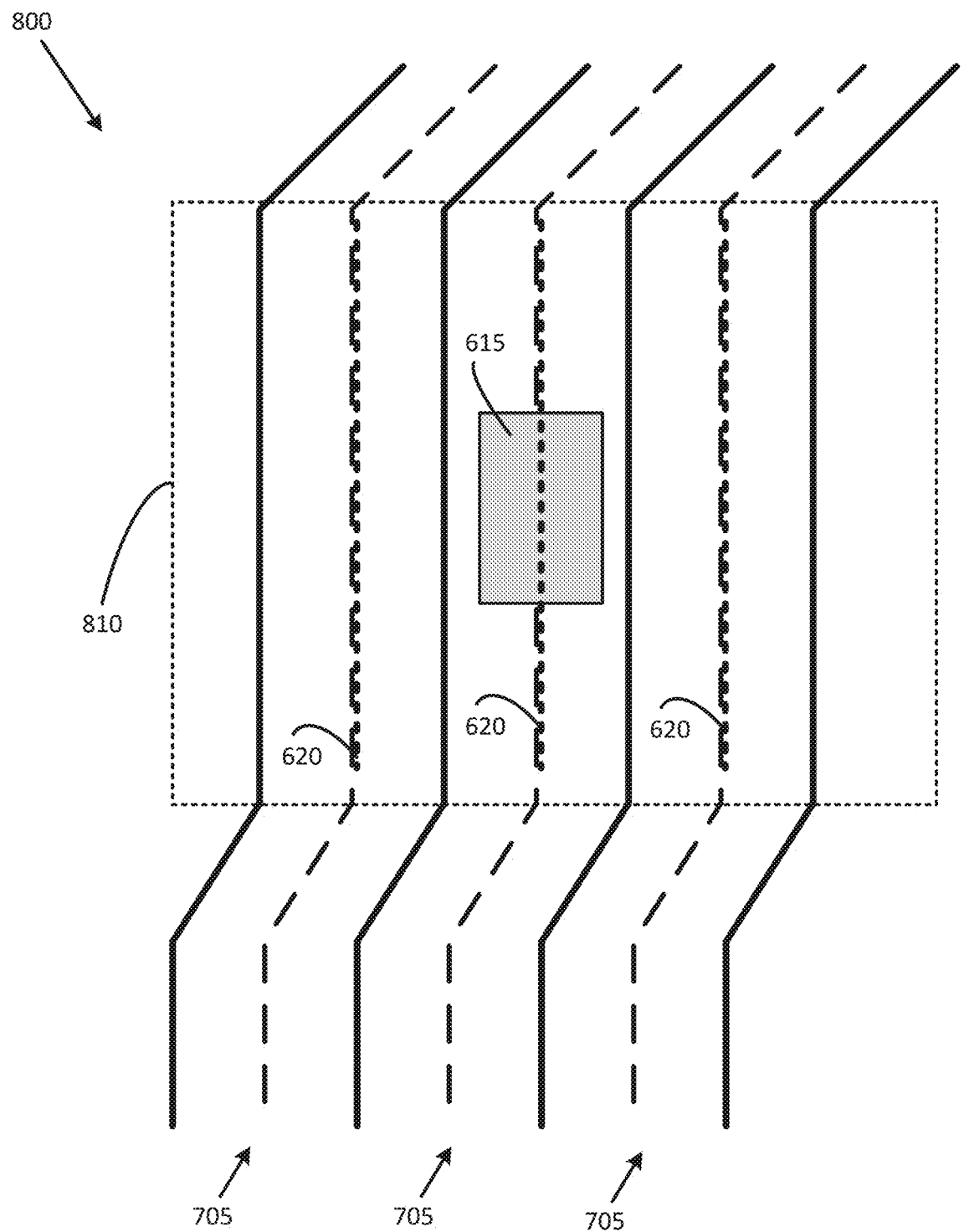
FIG. 8 shows an example of localization based on the lane detection and map data, in accordance with various embodiments.

Embodiments herein provide for a technique by which localization is performed based on vehicles that are within the vicinity of the AV 100. FIGS. 6-8 graphically depict an example technique by which lanes are identified based on the pose of other vehicles within the vicinity of the AV 100. The lanes are then compared to map data to identify a match between the lanes and the map data. Based on the match, localization is performed. As previously noted, as used herein, the term "pose" relates to both a position and an orientation of a vehicle such as AV 100, or a vehicle that is within the vicinity of the AV 100.

FIG. 6 shows an example of lane detection based on other vehicles, in accordance with various embodiments. Specifically, a number of vehicles are shown at depiction 605. The vehicles include a vehicle 615, which is similar to or shares one or more characteristics with AV 100. The vehicles at depiction 605 also include a number of other vehicles 610 that are within the vicinity of vehicle 615. As will be seen at depiction 605, the vehicles 610 and the vehicle 615 have a length as measured along the Y axis of FIG. 6. The vehicles 610 and the vehicle 615 also have a width as measured along the X axis of FIG. 6.

It will be well understood by a person having ordinary skill in the art that depiction 605 is a simplified depiction showing a total of twelve vehicles with uniform measurements arranged in a clear grid pattern. This simplification is shown for the ease of description of the present disclosure. It will be recognized that real-world embodiments will include differences such as more or fewer vehicles, vehicles that are offset from one another, vehicles with different widths or lengths, or other variations. Similar variations are further contemplated for other aspects or depictions of FIGS. 6, 7, and 8.

The vehicles 610 are detected by at least one sensor of the vehicle such as one of sensors 121 of FIG. 1. For example, a sensor such as a LiDAR system 402a, a RADAR system 402b, a camera system 402c, etc. is used by vehicle 615 to identify pose-related aspects of at least one of the vehicles 610 of FIG. 6.

Generally, it will be recognized that the majority of vehicles on the road have a length that is greater than their width, and that the vehicles travel in a direction parallel to their length. Therefore, as may be seen at depiction 625, lanes 620 are estimated based on the vehicles 610. Specifically, vehicle 615, or more specifically a perception circuit such as perception circuit 302 of vehicle 615, identifies the pose of the vehicles 610. As noted above, the "pose" of the vehicles 610 relates to both the location and the orientation of the vehicles 610.

Based on the location and the orientation of the vehicles 610, the vehicle 615 is able to interpret the location of lanes 620. For example, based on the orientation of one of vehicles 610, the vehicle 615 will be able to identify a direction of travel of vehicle 610. Specifically, the vehicle 615 (or a planning circuit of the vehicle such as planning circuit 304 will identify that the vehicle 610 is traveling in the direction in which it is oriented. The vehicle 615 will further use as a pre-condition for this analysis that vehicles 610 are obeying applicable traffic laws and are positioned within existing lanes of the roadway on which vehicles 610 and vehicle 615 are traveling. As such, based on the pose of the vehicles 610, vehicle 615 is capable of estimating the existence of lanes 620. In an embodiment, the estimation of the lanes 620 will be based on a technique such as piecewise linear regression, segmented linear regression, etc.

In one embodiment, the estimation of the lanes 620 is based on deep learning to initially detect the lanes 620, for example by mapping a raw image into a lane mask. Then, lane parameter estimation is performed wherein the curve of the lane may be fit to the pixel-level detections. Finally, the lane curve is "smoothed" by various tracking techniques. It will be recognized, however, that this is a high-level example and other techniques are additionally or alternatively present in other embodiments.

In another embodiment, the vehicle 615 will determine the existence of the lanes 620 based on the direction of travel of the vehicle 615 without analysis of the direction of travel of the vehicles 610. As an example of this embodiment, the orientation of the vehicles 610 will not be determined because the perception circuit 302 or the planning circuit 304 are not configured to determine such orientation. As an alternative example, the perception circuit 304 (and more particularly the sensor that is communicatively coupled with the perception circuit 304) will receive enough data to identify the presence of vehicle 610, but will be unable to distinguish whether the portion of the vehicle 610 that is identified is a front-end of the vehicle 610, a back-end of the vehicle 610, a side-view of the vehicle 610, etc. In this embodiment, the vehicle 615 will identify the orientation and direction of travel of the vehicle 615, and then determine the presumed direction of travel of the vehicles 610. For example, the vehicle 615 will assume that the vehicles 610 are traveling in generally the same direction as vehicle 615. Based on this extrapolation, the vehicle 615 will use as a pre-condition that the vehicles 610 are obeying applicable traffic laws regarding direction of travel and identify the lanes 620 based on such pre-condition.

It will be understood that these embodiments are described as example embodiments of how the vehicle 615 is configured to identify the presence of lanes 620. Other embodiments will include additional or alternative techniques, or a combination of the above-described techniques. An example of an additional technique is the determination of the pose of vehicles of different shapes or sizes. For example, in one embodiment the perception module 302 is configured to identify the pose of different shapes or sizes of vehicles such as a car, a compact car, a truck, a van, a commercial freight hauler, etc.

It will be understood that although FIG. 6 depicts estimation of lanes 620 based on the presence of eleven vehicles 610, in another embodiment the lanes 620 will be estimated based on only two vehicles. Specifically, vehicle 615 will estimate lanes 620 based on the pose of vehicles 610 in the leftmost lane 620 and the rightmost lane 620 (as oriented in FIG. 6). Specifically, vehicle 615 will estimate lanes 620 based on the pose of the enumerated vehicles at depiction 625. By identifying the pose of those vehicles, the leftmost lane 620 and the rightmost lane 620 are identified, and the presence of the center lane 620 is then inferred.

In other embodiments, the estimation of the lanes 620 at depiction 625 is based on one or more additional factors. For example, in an embodiment the estimation of the lanes 620 at depiction 625 is based on factors such as lane lines, other road markings, barriers or barricades at the side of the road, rumble strips, etc.

It will also be understood that although the lanes 620 are depicted as generally straight, this depiction is a simplified discussion for the sake of discussion of the subject matter of the present disclosure. In other embodiments, the lanes 620 will have a difference such as a curvature, a hill, merging lanes or exit lanes, etc.

In another embodiment, the estimation of the lanes 620 at depiction 625 will be based on a metric related to the quality of estimation of the pose of one or more of the vehicles 610. For example, one example of an indicator of the quality of estimation is a certainty factor that is applied to the estimation of the pose of each of the vehicles 610. As used herein, a "certainty factor" refers to one or more numeric factors, values, or functions that are applied to information related to one or more of the vehicles 610, and which provides an output which is compared against a threshold. For example, the certainty factor is based on the type of information that the vehicle 615 can identify about the respective vehicles 610, the distance of one of the vehicles 610 from the vehicle 615, the variance of the position or orientation of the vehicle 610 from others of the vehicles 610, the variance of the position or orientation of the vehicle 610 from vehicle 615, etc.

In an embodiment, the certainty factor is reduced or otherwise affected by vehicles 610 whose pose, shape, or size are not easily identifiable by the vehicle 615, either as analyzed by itself or analyzed in the context of others of the vehicles 610. For example, if a vehicle 610 is changing lanes, then its pose or location will deviate from that of other vehicles 610 that are driving within a lane. As another example, a larger vehicle such as a semi or other large vehicle will present a different profile to the sensor, and therefore it will appear differently than others of the vehicles 610. In these situations, the certainty factor associated with the vehicle that is changing lanes or the vehicle which appears different than others of the vehicles will be reduced such that the data related to that vehicle is handled differently or discarded.

If the certainty factor related to one of the vehicles 610 is below (or, at or below) a threshold value, then that vehicle 610 is excluded from the estimation of the lanes 620, weighted to affect the estimation of the lanes 620 less, etc. In some embodiments, the threshold is a pre-identified threshold (e.g., one standard deviation) while in other embodiments the threshold is dynamic (e.g., the three vehicles 610 with the lowest certainty factor).

Based on the identified lanes 620, and as is shown at depiction 630, the vehicle 615, or more specifically the perception circuit 302 of the vehicle 615, will then identify its location and orientation (e.g., its pose) within the identified lanes 620. In another embodiment, the vehicle 615 is not located in the center lane 620, but rather is in one of the leftmost or rightmost lanes 620. Identification of the pose of the vehicle 615 will be based on, for example, the pose of the other vehicles 610 that are within the vicinity of the vehicle 615.

Information related to the pose of the vehicle 615, for example as identified at depiction 630, will then be provided to a localization circuit of the vehicle 615 such as localization circuit 308 of FIG. 3. The localization circuit will then compare the identified pose of the vehicle 615 as well as information related to the lanes 620 to map data to identify the location of the vehicle 615.

FIG. 7 shows a simplified top-down example of map data 700, in accordance with various embodiments. Specifically, the map data 700 depicts information such as the shape or layout of a number of lanes 705. In an embodiment, the map data 700 retrieved by the localization circuit from, for example, a database such as database 310 of FIG. 3. In another embodiment, the map data 700 is retrieved from a database or repository that is external to the vehicle 615, i.e., from the cloud.

In an embodiment, identification of the map data by the vehicle 615 is based on a last-known location of the vehicle 615. For example, if the vehicle 615 was previously known to be in a location, then the map data 700 would include areas that are within the vicinity of that last-known location. In one embodiment, the identification of the map data is based on the last-known pose of the vehicle 615. For example, if the vehicle had a pose, then that pose would indicate a trajectory of the vehicle such that map data 700 is based on that indicated trajectory. In another embodiment, the map data 700 is additionally or alternatively based on one or more factors such as the speed of the vehicle 615, a previously identified trajectory of the vehicle 615, predictive analysis of the driving habits of the driver of the vehicle 615, a known destination of the vehicle 615, or some other factor. It will be understood that these factors are intended as examples, and other embodiments will additionally or alternatively based the map data 700 on other factors that are not explicitly stated here.

FIG. 8 shows an example of localization 800 based on the lane detection of FIG. 6 and the map data of FIG. 7, in accordance with various embodiments. Specifically, the localization circuit of the vehicle 615 attempts to match the lanes 620 identified at depiction 630 of FIG. 6 with the map data 700 identified at FIG. 7. In an embodiment, the localization circuit of the vehicle 615 matches the identified lanes 620 with the map data 700 through a convolutional algorithm. In another embodiment, the match is performed based on a regression analysis. Other techniques or algorithms are additionally or alternatively used in other embodiments.

As is shown in FIG. 8, the lanes 620 identified in FIG. 6 correspond to the portion 810 of the lanes 705. Based on the correspondence of the lanes 620 to the lanes 705 at portion 810, the vehicle 615, and particularly the localization circuit of the vehicle 615, is able to identify the location of the vehicle with respect to the map data 700. Further, based on the pose of the vehicle 615 identified at depiction 630, the vehicle 615 is able to identify the pose of the vehicle 615 with respect to the map data 700. In this manner, the vehicle is enabled to perform localization (e.g., identification of the pose of the vehicle with respect to known map data) in situations where there are few or no landmarks, or such landmarks are blocked, which would normally be used by the vehicle 615 to perform localization.

Figure 9:
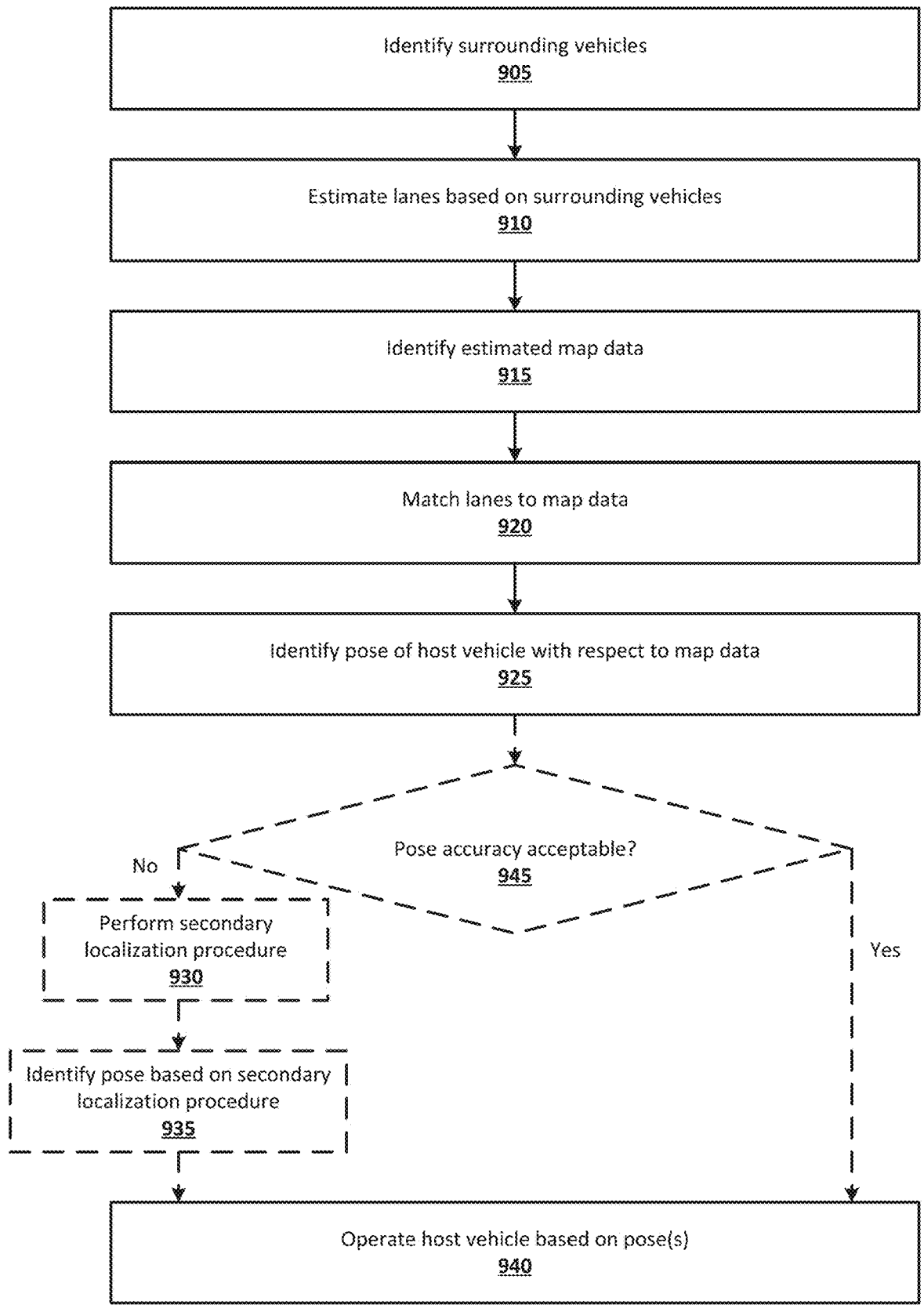
FIG. 9 shows an example of a localization technique, in accordance with various embodiments.

FIG. 9 shows an example of a localization technique, in accordance with various embodiments. The technique includes elements that are similar to those described above with respect to FIGS. 6, 7, and 8, and is performed by elements of a vehicle such as the perception circuit 302, the localization circuit 308, etc. More generally, in an embodiment, the technique is performed by processor 204.

The technique includes identifying, at 905, surrounding vehicles such as vehicles 610. As described, the surrounding vehicles are identified by a sensor such as the LiDAR system 402a, the RADAR system 402b, the camera 402c, etc.

As described above with respect to, for example, depiction 625 of FIG. 6, the technique further includes estimating, at 910, lanes such as lanes 620. Specifically, the lanes are estimated based on the pose of the surrounding vehicles 610, the pose of the vehicle 615, or both. The lanes are estimated based on an estimation technique such as regression or some other technique.

The technique further includes identifying, at 915, an estimated map data such as map data 700. As noted with respect to FIG. 7, in an embodiment the identification of the map data is based on a previous known location of the vehicle. In another embodiment, the identification of the map data is based on one or more factors such as a known heading or trajectory of the vehicle, known driving habits of a driver of the vehicle, a known destination of the vehicle, etc. In one embodiment, the map data is identified by a circuit or logic on the vehicle, while in another embodiment the map data is at least partially identified by neural network on the vehicle or at least partially external to the vehicle (e.g., in the cloud) or some other logic.

The technique further includes matching, at 920, the identified lanes from element 910 to the map data identified at 915. As described above with respect to FIG. 8, in an embodiment this match is performed based on an analysis such as a regression analysis, a convolutional analysis, or some other technique.

The technique further includes identifying, at 925, the pose of the host vehicle with respect to the map data. As described above with respect to FIG. 8, the pose of the host vehicle is identified at 925 based on the match of the map data from element 915 to the estimated lanes at 910. The pose of the host vehicle identified at 925 is further based on information such as the identified pose of the host vehicle with respect to the estimated lanes from element 910.

In one embodiment, the technique then proceeds from element 925 to operating, at 940, the host vehicle based on the pose. For example, the pose of the vehicle, or the localization procedure in general, is used by a circuit such as a planning circuit 304 or the control circuit 306 (or both) to identify a trajectory or specific controls that are to be used by the vehicle to travel.

In another embodiment, the localization procedure described with respect to elements 905/910/915/920/925 is one of multiple localization procedures that the vehicle is capable of performing. In one embodiment, it is desirable to verify the accuracy of the vehicle pose identified at 925. For example, in an embodiment the vehicle is capable of identifying one or more metrics related to certainty of the lane estimates at 920, the map data identified at 915, the match identified at 920, etc. Therefore, optionally, the technique includes elements 930, 935, and 945.

Specifically, in this embodiment the technique includes identifying, at 945, whether the pose accuracy is acceptable. The identification at 945 is based on one or more factors such as the certainty metrics associated with elements 915, 920, or 925. In another embodiment the identification at 945 is additionally or alternatively based on one or more other certainty related metrics. The identification at 945 relates to a comparison of one or more of the certainty metrics to a pre-identified threshold (e.g., whether the certainty is within one standard deviation, etc.). In another embodiment the identification at 945 is based on a dynamic threshold that is based on factors such as the number of cars identified at 905, the type of sensor used to identify the vehicles at 905, the number of lanes or the technique used to identify the lanes at 910, etc. In these techniques, the pose accuracy is identified at 945 as acceptable if, for example, one or more of the certainty metrics are above (or, at or above) one or more of the thresholds. Other criteria are used in other embodiments If the pose accuracy is identified as acceptable at 945, then the technique proceeds to operation of the host vehicle at 940 as described above. However, if the pose accuracy is not identified as acceptable at 945, then a secondary localization procedure is performed at 930. In one embodiment, the secondary localization procedure includes re-performing elements 905, 910, 915, 920, and 925. In another embodiment, the secondary localization procedure is a localization procedure such as LiDAR scan matching, visual feature matching, deep learning-based localization, etc.

The pose of the vehicle is then identified at 935 based on the secondary localization procedure at 930. In an embodiment, the pose of the vehicle is identified at 935 is based solely on the localization procedure at 930. In another embodiment, the pose of the vehicle is identified at 935 based on a combination of the pose identified at 925 and the localization procedure at 930. For example, in an embodiment the pose of the vehicle is identified at 935 based on an averaging of information related to the pose identified at 925 and the localization procedure performed at 930 to produce an average pose of the vehicle. In another embodiment, the pose of the vehicle is identified at 935 based on a function such as a median of information related to the elements 925 and 935, a mean of information related to elements 925 and 930, etc. The vehicle is then be operated at 940 based on one or both of the poses identified at 925 or 935.

It will be understood that the above technique of FIG. 9 wherein the secondary localization procedure is performed at 930 as a result of an unacceptable pose accuracy at 945 is intended as one example technique, and other embodiments will vary. For example, in another embodiment it is desirable to consistently perform the secondary localization procedure at 930 such that the pose of the vehicle is based on a combination of the pose identified at 925 and the secondary localization procedure at 930.

FIG. 10 shows an alternative example of a localization technique, in accordance with various embodiments. Generally, FIG. 10 is intended as complimentary to the technique of FIG. 9 and includes one or elements that are similar to those of FIG. 9. Similarly to FIG. 9, the technique of FIG. 10 is performed by elements of a vehicle such as the perception circuit 302, the localization circuit 308, etc. More generally, in an embodiment, the technique is performed by processor 204.

The technique includes identifying, at 1005, sensor data from a sensor of a first vehicle, wherein the sensor data includes information related to a pose of at least two other vehicles on a road relative to the first vehicle. The identification at 1005 is similar to, for example, the identification at 905 or as described with respect to vehicles 610 at depiction 605 of FIG. 6. The first vehicle is, for example, the vehicle 615 of FIG. 6.

The technique further includes determining, at 1010, a geometry of a portion of the road based at least in part on the information about the pose of the at least two other vehicles. For example, the determination is identifying lanes such as lanes 620 of FIG. 6 and the estimation of the lanes at 910.

The technique further includes comparing, at 1015, the geometry of the portion of the road with map data (e.g., the map data 700 identified at FIG. 7 or at element 915) to identify a match between the portion of the road and a portion of the map data (e.g., portion 810 of FIG. 8). The comparison is as described with respect to, for example, FIG. 8 or element 920.

The technique further includes determining, at 1020, a pose of the first vehicle relative to the map data based at least in part on the match. The determination of the pose is similar to that described above with respect to element 925 of FIG. 9 or as depicted in FIG. 8, above.

It will be understood that the techniques of FIGS. 9 and 10 are intended as examples of one embodiment, and other embodiments include one or more variations from the depicted techniques. For example, in another embodiment certain elements are performed concurrently or in a different order than depicted. Other embodiments include more or fewer elements than are depicted. Other variations are present in other embodiments.

Additionally, it will be noted that although the description of FIGS. 6, 7, and 8, as well as the description of the techniques of FIGS. 9 and 10, are made herein with respect to lanes, the use of "lanes" herein is intended as one example embodiment. The concepts herein could be extended to other road geometries in other embodiments. As one example, comparison of a vehicle (e.g., vehicle 615) to information related to other vehicles (e.g., vehicles 610) are also applicable to the identification of unique road geometries such as an embankment. In this example, the angle of a vehicle 610 (either as compared to another of the vehicles 610, the vehicle 615, as compared to the horizon, etc.) is used to identify the presence of such an embankment. Once the embankment is identified, map data related to a last known location of vehicle 615 is compared to identify the location, orientation, or pose of the vehicle 615 based on the embankment.

As another example, localization is performed based on the presence of a roundabout or curved lanes. Specifically, if the location, orientation, or pose of vehicles 610 indicate the presence of a curved lane or roundabout, then that curved lane or roundabout is compared with map data related to the vehicle 615 to identify the location, orientation, or pose of the vehicle within the map data. Other embodiments use additional or alternative features or road data (e.g., hills, merge or exit lanes, etc.)

In the foregoing description, embodiments of the invention have been described with reference to numerous specific details that vary from implementation to implementation. The description and drawings are, accordingly, to be regarded in an illustrative rather than a restrictive sense. The sole and exclusive indicator of the scope of the invention, and what is intended by the applicants to be the scope of the invention, is the literal and equivalent scope of the set of claims that issue from this application, in the specific form in which such claims issue, including any subsequent correction. Any definitions expressly set forth herein for terms contained in such claims shall govern the meaning of such terms as used in the claims. In addition, when we use the term "further comprising," in the foregoing description or following claims, what follows this phrase can be an additional step or entity, or a sub-step/sub-entity of a previously-recited step or entity.

What is claimed is:

1. A computer-implemented method, comprising:
   identifying, with at least one processor, sensor data from a sensor of a first vehicle, wherein the sensor data includes information related to a pose of at least two other vehicles on a road;
   determining, with the at least one processor, a geometry of a portion of the road based at least in part on the information about the pose of the at least two other vehicles;
   comparing, with the at least one processor, the geometry of the portion of the road with map data to identify a match between the portion of the road and a portion of the map data;
   determining a pose of the first vehicle relative to the map data based at least in part on the match; and
   causing, with a control circuit, the vehicle to navigate based at least in part on the determined pose.

2. The method of claim 1, wherein the sensor is a visual sensor or a range sensor.

3. The method of claim 1, wherein the sensor data includes information about a location of respective ones of the at least two other vehicles relative to the first vehicle.

4. The method of claim 1, wherein the sensor data includes information about an orientation of respective ones of the at least two other vehicles relative to the first vehicle.

5. The method of claim 1, wherein the portion of the road is a lane of the road.

6. The method of claim 1, wherein determining the pose of the first vehicle includes determining a position and orientation of the first vehicle relative to the map data based at least in part on the match.

7. One or more non-transitory computer-readable media comprising instructions that, upon execution of the instructions by one or more processors, are to cause a vehicle to:
   identify sensor data from a sensor of a first vehicle, wherein the sensor data includes information related to a pose of at least two other vehicles on a road;
   determine a geometry of a portion of the road based at least in part on the information about the poses of the at least two other vehicles on the road, wherein the information is captured by a sensor of the vehicle;
   compare the geometry of the portion of the road with map data to identify a match between the portion of the road and a portion of the map data;
   determine a pose of the first vehicle relative to the map data based at least in part on the match; and
   cause the vehicle to navigate based at least in part on the determined pose.

8. The one or more non-transitory computer-readable media of claim 7, wherein the instructions are further to determine an accuracy of the pose of the first vehicle relative to the map data based at least in part on a quality of the match between the portion of the road and the portion of the map data.

9. The one or more non-transitory computer-readable media of claim 7, wherein the instructions are further to determine an accuracy of the pose of the first vehicle relative to the map data based at least in part on a number of the at least two other vehicles.

10. The one or more non-transitory computer-readable media of claim 7, wherein the pose of the first vehicle is a first pose, and the instructions are further to:
    determine an accuracy of the first pose of the first vehicle relative to the map data; and
    in response to a determination that the accuracy of the first pose does not satisfy a predefined threshold, execute a localization process to determine a second pose of the first vehicle relative to the map data.

11. The one or more non-transitory computer-readable media of claim 10, wherein the instructions are further to:
    average the first pose and the second pose to determine an average pose for the first vehicle relative to the map data.

12. A vehicle comprising:
    a sensor;
    one or more processors; and
    one or more non-transitory computer-readable media comprising instructions that, upon execution of the instructions by the one or more processors, are to cause the vehicle to:
    identify sensor data from the sensor of the vehicle, wherein the sensor data includes information related to a pose of at least two other vehicles on a road;
    determine a geometry of a portion of the road based at least in part on the information about the pose of the at least two other vehicles;
    compare the geometry of the portion of the road with map data to identify a match between the portion of the road and a portion of the map data;
    determine a pose of the vehicle relative to the map data based at least in part on the match; and
    cause the vehicle to navigate based at least in part on the determined pose.

13. The vehicle of claim 12, wherein the instructions are further to identify the sensor data from the sensor in response to a determination that the vehicle is traveling on a highway.

14. The vehicle of any claim 12, wherein the instructions are further to identify the sensor data from the sensor in response to a determination that the sensor is obstructed.

15. The vehicle of claim 12, wherein the instructions are further to identify the sensor data from the sensor in response to a determination that an accuracy of a pose of the vehicle relative to the map data produced by a localization process does not satisfy a predefined threshold.

16. The vehicle of claim 12, wherein the instructions are further to:
    determine a previous location of the vehicle; and
    compare the geometry of the portion of the road with map data for the previous location of the vehicle to identify the match between the portion of the road and the portion of the map data.

17. The vehicle of claim 12, wherein comparison of the geometry of the portion of the road with the map data includes performance of a convolution of the determined geometry of the portion of the road and the map data.

18. The vehicle of claim 12, wherein the instructions are further to:
    determine a pose of the vehicle relative to the geometry of the portion of the road; and
    wherein determination of the pose of the vehicle relative to the map data based at least in part on the match includes mapping the pose of the vehicle relative to the geometry of the portion of the road to the map data.

19. The vehicle of claim 12, wherein the sensor is a visual sensor or a range sensor.

* * * * *